H. E. SMYTHE & E. W. SHINN.
CHARGER AND STIRRER FOR GAS PRODUCERS.
APPLICATION FILED MAY 13, 1908.

899,572.

Patented Sept. 29, 1908.
5 SHEETS—SHEET 1.

WITNESSES:

INVENTORS
H. E. Smythe
E. W. Shinn
by F. N. Barber
ATTORNEY

H. E. SMYTHE & E. W. SHINN.
CHARGER AND STIRRER FOR GAS PRODUCERS.
APPLICATION FILED MAY 13, 1908.

899,572.

Patented Sept. 29, 1908.

5 SHEETS—SHEET 3.

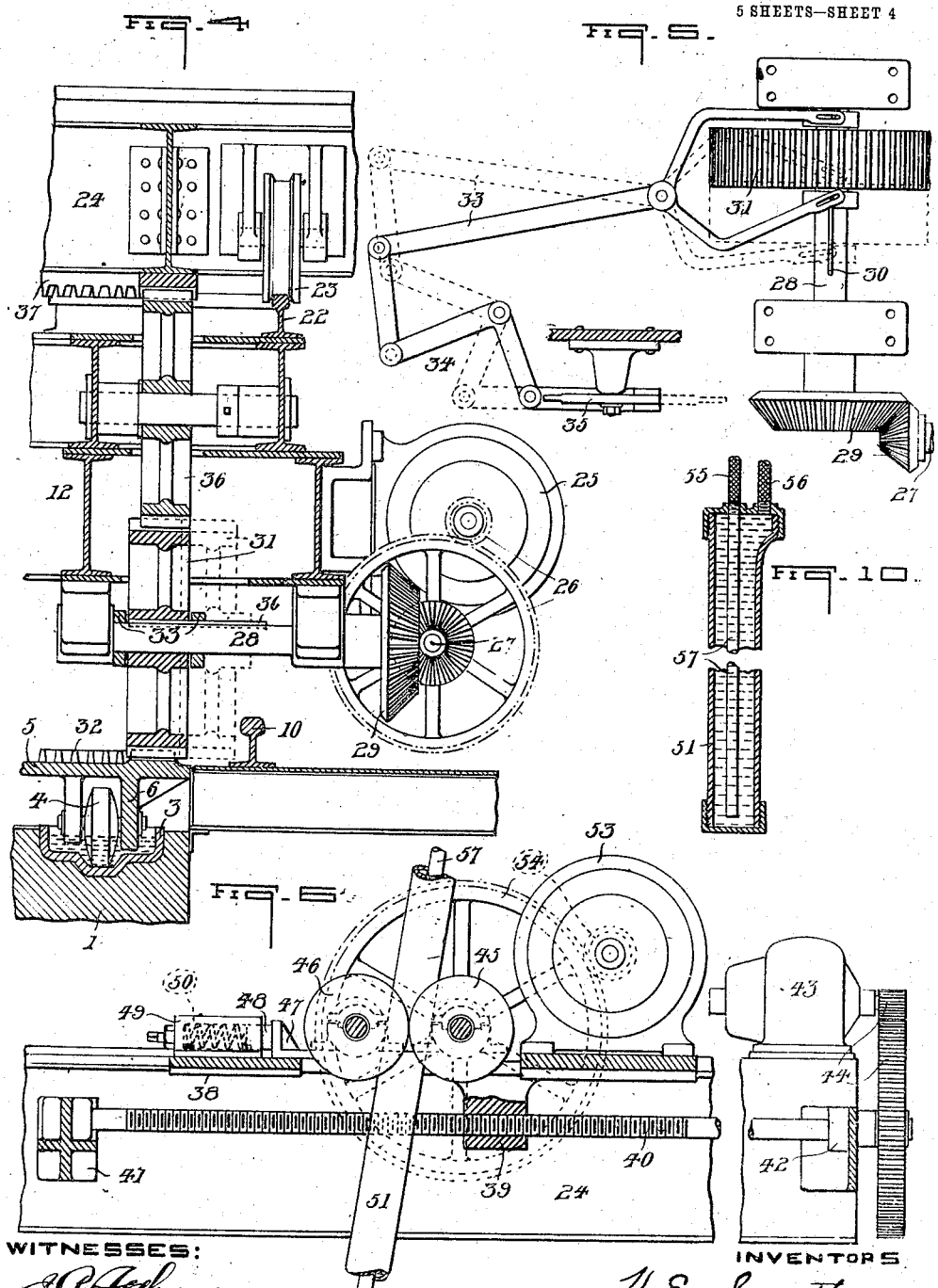

H. E. SMYTHE & E. W. SHINN.
CHARGER AND STIRRER FOR GAS PRODUCERS.
APPLICATION FILED MAY 13, 1908.
899,572.
Patented Sept. 29, 1908.
5 SHEETS—SHEET 5.
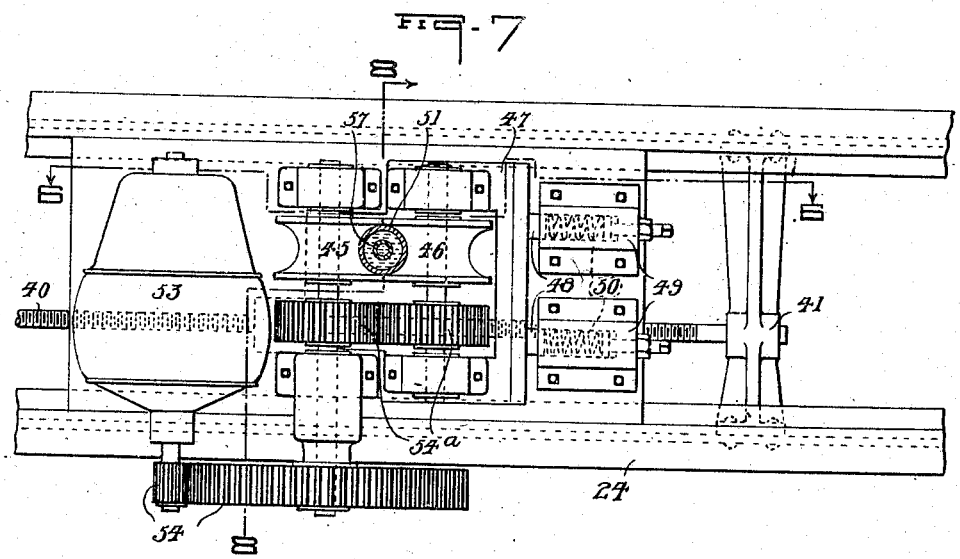
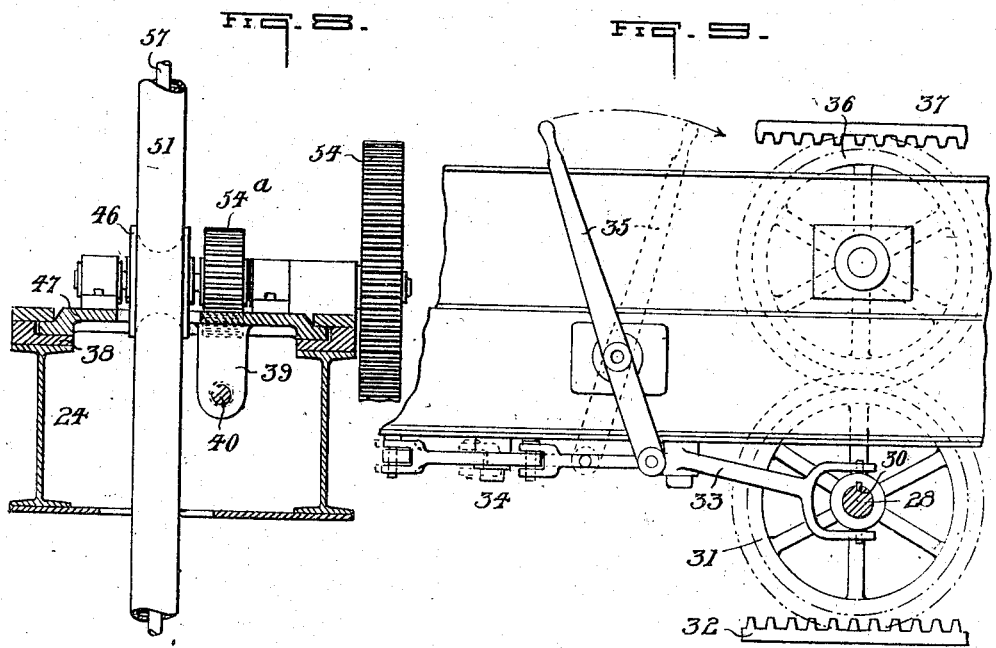
WITNESSES:
INVENTORS
H. E. Smythe
E. W. Shinn
by F. N. Barber
ATTORNEY

UNITED STATES PATENT OFFICE.

HORACE E. SMYTHE, OF OAKMONT, AND EDMUND W. SHINN, OF PITTSBURG, PENNSYLVANIA, ASSIGNORS TO THE S. R. SMYTHE COMPANY, OF PITTSBURG, PENNSYLVANIA, A CORPORATION OF WEST VIRGINIA.

CHARGER AND STIRRER FOR GAS-PRODUCERS.

No. 899,572.   Specification of Letters Patent.   Patented Sept. 29, 1908.

Application filed May 13, 1908. Serial No. 432,625.

*To all whom it may concern:*

Be it known that we, HORACE E. SMYTHE and EDMUND W. SHINN, citizens of the United States, residing at Oakmont and Pittsburg, respectively, in the county of Allegheny and State of Pennsylvania, have invented or discovered new and useful Improvements in Chargers and Stirrers for Gas-Producers, of which the following is a specification.

Our invention relates to mechanism for charging and poking gas producers and has for its object to produce an apparatus which can be made to travel from one to another of a set of gas producers for the purpose of charging them and of agitating or poking the charges.

Figure 1:
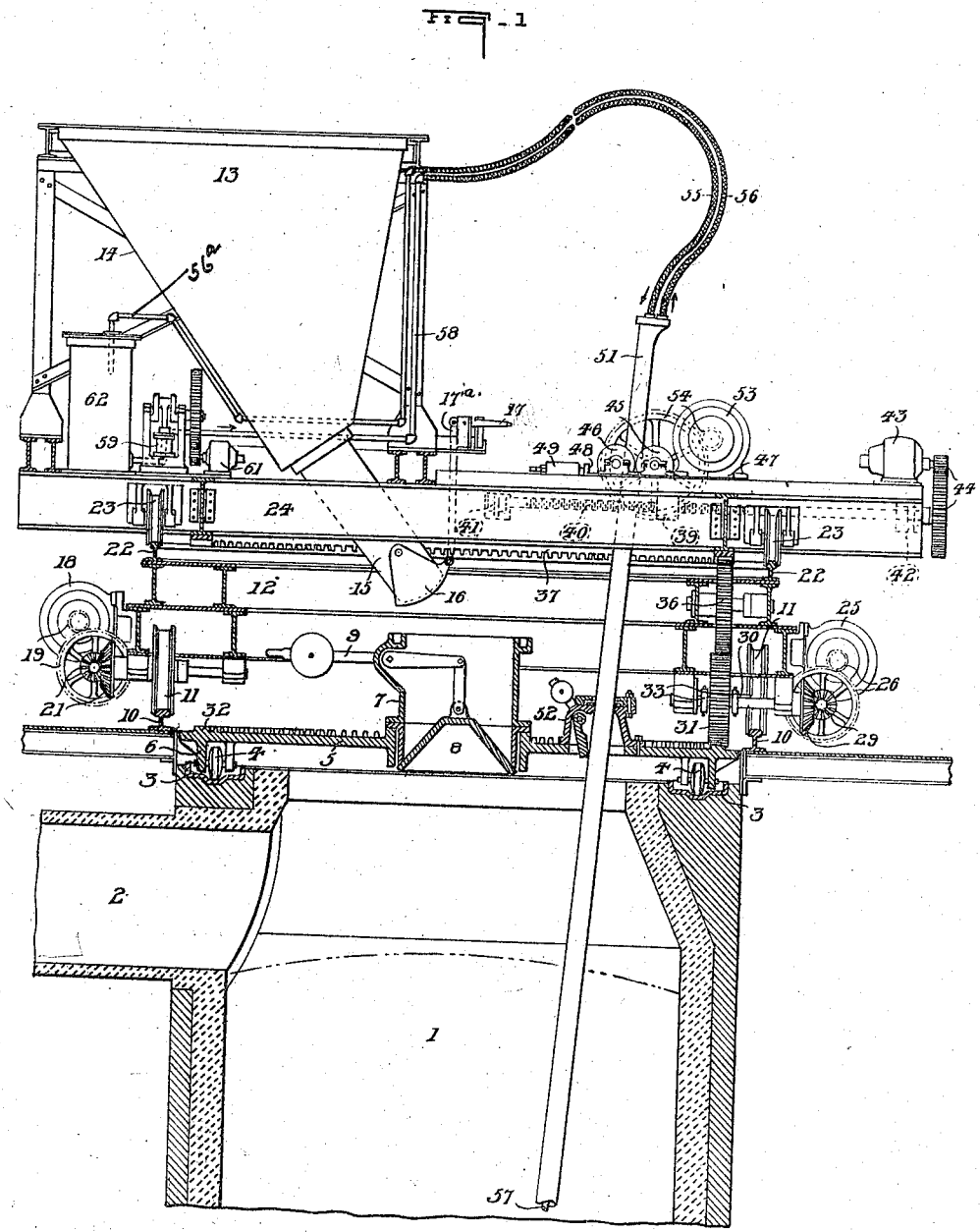
Figure 2:
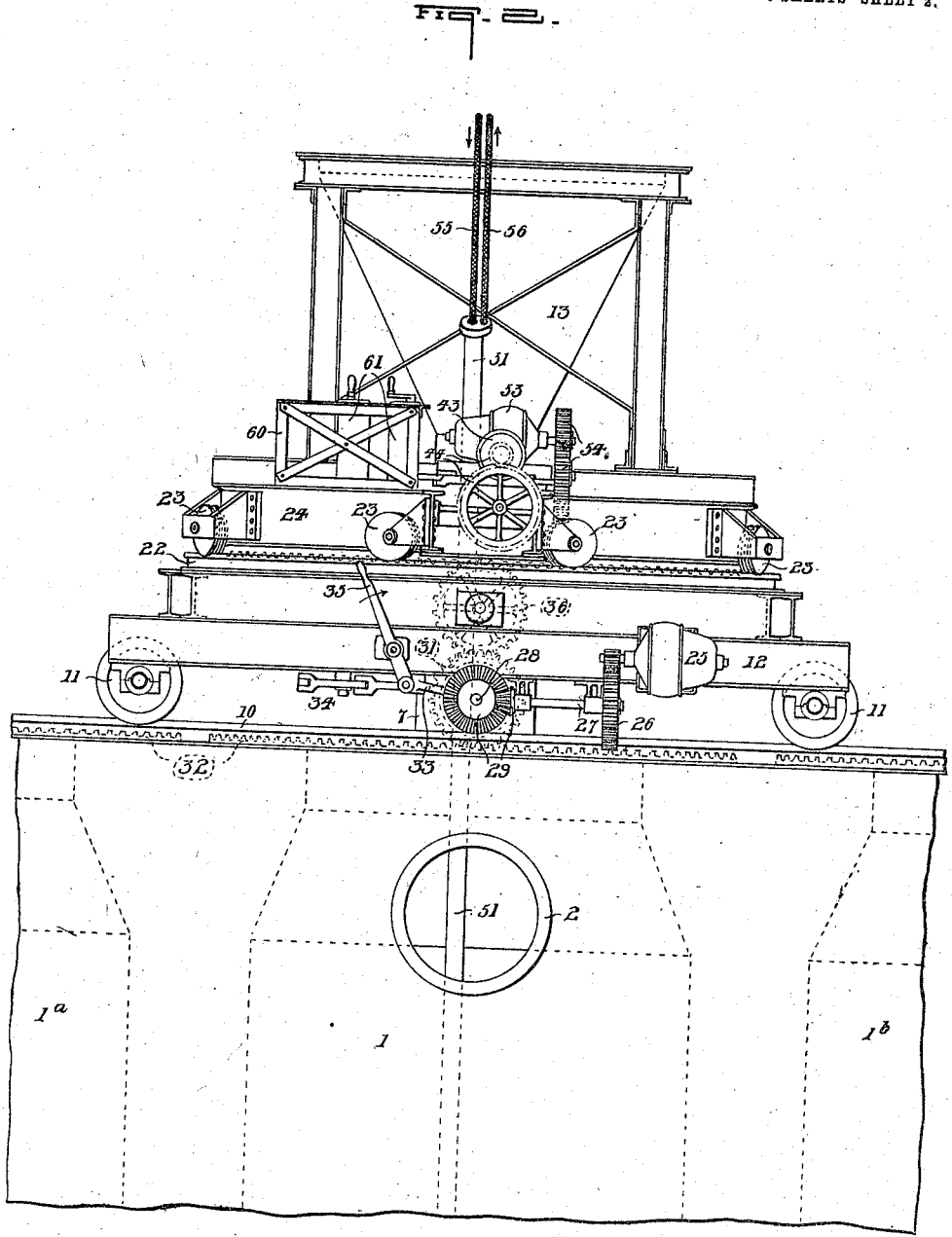
Figure 3:
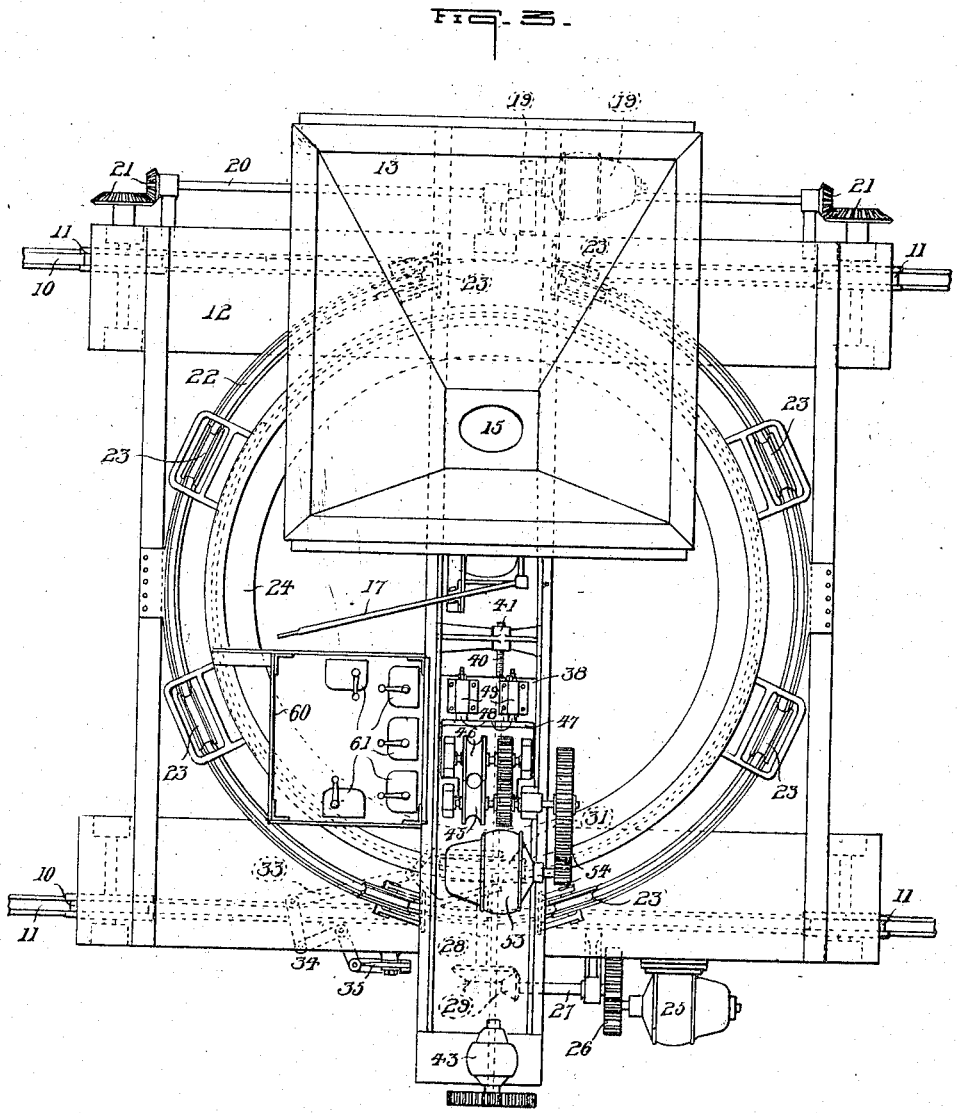

Referring to the drawings which accompany this specification, Figure 1 is a vertical section of a gas-producer and our invention associated therewith; Fig. 2, a side elevation of Fig. 1 looking to the left; Fig. 3, a plan of our invention, omitting the gas-producers; Fig. 4, a fragmentary view showing a vertical section through the driving mechanism for the top-plate 5 of the producer and the trolley 24; Fig. 5, a detail of the mechanism sliding the gear 31 on its driving shaft; Fig. 6, a section showing the poker operating mechanism; Fig. 7, a plan of the same, the poker being in cross-section; Fig. 8, a section of Fig. 7 on the line 8—8; Fig. 9, a side elevation partly in section, showing the gearing for the racks 32 and 37 and the shifting mechanism for the gear-wheel 31; and Fig. 10, a vertical section, partly broken away, of the poker.

1 represents a gas producer, having the off-take pipe 2 for gases. The top of the producer body has a circular channel 3 constituting a track for the wheels 4 of the producer top plate 5, which has a circular down-turned flange 6 in the said channel, so that water or other sealing material in the channel may render the top 5 gas-tight. The top 5 is provided with a suitable charging device, such as the hopper 7 which is provided with the well-known bell 8, controlled by the lever 9 or otherwise. 1ª and 1ᵇ show portions of two other gas producers in line with the producer 1. A pair of rails 10 extend along the tops of these producers, on which rails the wheels 11 of the car 12 roll.

On the car 12 is the hopper 13 having the inclined bottom 14, and the delivery spout 15, the latter terminating at a suitable point to deliver fuel into the hopper 7, when the gate 16 at the lower end of the spout has been swung up from beneath the same by means of the handle 17 and link 17ª or other mechanism. The spout is so situated as to deliver the contents of the hopper 13 into the hopper 7 of any of the producers provided the car be moved into proper position, which is accomplished by means of the motor 18. This motor through the spur-gears 19 drives the shaft 20, which is connected by bevel gears 21 to two of the wheels 11.

The car 12 supports the circular track 22 on which the wheels 23 of the trolley 24 travel.

25 is a motor which is carried by the car 12 and which through the spur-gears 26 drives the shaft 27. The shaft 27 drives the shaft 28 by means of the intermediate bevel-gears 29. The shaft has thereon the spline 30, on which the spur-gear 31 may slide but which compels the gear 31 to rotate therewith. This gear 31 normally meshes with the circular rack 32 on the top plate 5, but by means of the fork-lever 33 and the system of levers 34 and the handle 35, may be slid on the shaft 28 so as to be out of mesh with the said rack. The gear-wheel 31 also meshes with the spur-gear 36 which has such a length as to be in mesh with the wheel 31, no matter in which position the latter may be. The gear wheel 36 meshes with the circular rack 37 on the trolley 24.

The trolley 24 supports a radially movable bed plate 38, provided with the pendent lug 39 in which the radially arranged screw 40 works, the ends of the screw being journaled in the bearings 41 and 42. The screw is rotated by the motor 43 and the intermediate gearing 44. The bed-plate 38 supports the fixed roller 45 which stands opposite to and parallel with the roller 46 which is carried by the carriage 47, slidable within small limits on the said bed-plate. The carriage 47 has a pair of lugs 48 seated in the sockets 49 on the bed-plate the springs 50 being seated in the sockets and bearing against the said lugs to yieldingly hold the roller 46 as close as possible toward the fixed roller 45. The rollers are grooved so as to form a circular pass between them for the reception of the poker 51.

The poker 51 is a long cylindrical hollow bar, which may reach down below the rollers 45 and 46 and through the poke-hole 52 in the top-plate 5. The poker is caused to rise and fall by means of the motor 53 and the intermediate gearing 54 which connects the motor shaft to the shaft of the roller 45. The roller shafts are provided with the intermeshing gears 54$^a$ to give the rollers equal speed.

The poker 51 has the two flexible tubes 55 and 56 connected to its upper end, the tube 55 being connected to the tube 57 which extends toward the lower end of the hollow in the poker. The tube 55 is connected through the pipe 58 to the lower portion of the pump cylinder 59, whose piston 60 is driven by the motor 61. The tube 56 is connected by the pipe 56$^a$ to the top of the water tank 62 which with the motor 61 and the pump lies beneath the bottom 14 of the hopper 13. The bottom of the tank is connected to the lower end of the pump cylinder 59.

60 is the operator's cage or cab in which are the controllers 61, which are connected in the well-known manner to the several motors and a source of energy for starting, stopping and reversing the same.

The poke-hole 52 may be variously constructed, but I have shown it provided with the valve 62 which is removed from the hole by the poker, but will return to close the hole when the poker has been withdrawn.

The operation of charging the gas producers will be readily understood from the foregoing description. In order to agitate or poke a charge in the gas-producer, the car, with the poker elevated above the top-plates of the producers, is moved on the rails 10 by the motor 18 until the axes of rotation of the top-plate 5 and the trolley 24 are in alinement. If the poker, when vertical, does not stand over the poke-hole, that is, if the poker and the poke-hole do not stand in the same vertical plane which is radial both as to the top-plate and the trolley, then the handle 35 is moved to the position shown in dotted lines on Fig. 9 to disconnect the gear-wheel 31 from the rack 32 to the positions shown in dotted lines on Figs. 1 and 5, whereupon the motor 25 is actuated so as to move the poker into the required position above the pokehole. The position of the handle 35 is reversed to the position shown in full lines and the gear 35 and the rack 32 reëngaged. The motor 53 is then operated to drive the poker down through the poke-hole and into the fuel in the producer. The pump-motor 61 is started to keep up a circulation of water in the poker; the motor 43 is caused to rotate alternately in opposite directions to give the poker radial movement in the producer; the motor 25 is started to give the top-plate 5 and the trolley 24 rotary movement, their movement being in the same direction and at the same speed, whereby the poker travels with the top-plate in a circle. When the charge has been sufficiently poked, the several motors are stopped and the poker is lifted from the poke-hole, the car is moved so as to bring the trolley over the top-plate of another producer, when the operation just described is repeated. The hopper 13 may be filled and discharged into any of the hoppers 7 of any of the producers, as necessity requires. When the spout 15 is brought over a hopper 7, the lever 17 is lowered, causing the gate 16 to rise. The charge in the hopper 13 will then pass into the hopper 7 until the gate 16 is returned by the lever 17 so as to close the spout 15. The charge in the hopper 7 may be discharged into the producer by lifting the lever 9, whereby the bell 8 is lowered permitting the charge to slide into the producer.

It will be seen that we are enabled to poke the entire charge from center to circumference and to any desired depth, the poker having a zig-zag movement in the charge as it travels in a circle with the poke-hole 52. It will be noticed that the poke-hole serves as a fulcrum for the poker.

We claim—

1. The combination of a gas producer, a rotatable top therefor, a poke-hole on said top, a poker, a rotatable carrier for said poker, means for rotating said top and carrier at the same speed and in the same direction, and means for moving the poker transversely of its rotary movement with said top and carrier.

2. The combination of a gas producer, a rotatable top therefor, a poke-hole on said top, a poker, a rotatable carrier for said poker, means for rotating said top and carrier at the same speed and in the same direction, means for moving the poker transversely of its rotary movement with said top and carrier, and means for moving the poker vertically.

3. The combination of a gas producer, a rotatable top therefor, a poke-hole on said top, a poker, a rotatable carrier for said poker, means for rotating said top and carrier at the same speed and in the same direction, means for producing relative rotary movement of said top and carrier, and means for moving the poker transversely of its rotary movement with said top and carrier.

4. The combination of a battery of gas producers, a car movable over the same, and a poker carried on said car and arranged to be introduced into any of said producers to agitate the charge therein and means for causing the poker to travel circularly within the producer.

5. The combination of a battery of gas-producers, a car movable over the same, a rotary trolley on said car, a rotatable top on each gas producer, a poke-hole on each top, a poker, adapted to pass through each pokehole, means for causing the rotation of said trolley and each of said tops at the same speed and in the same direction, and means for moving the poker transversely of its rotary movement.

6. The combination of a gas producer, a rotary top therefor having therein a poke-hole, a car, a poker carried by the car and adapted to pass through said poke-hole, and means on the car for vibrating the poker, the poke-hole serving as a fulcrum for said poker during its vibrations.

7. The combination of a gas producer, a top therefor having therein a poke-hole, a poker in said poke-hole, a pair of feed rollers above the top having a pass between them for the poker, means for moving the rollers transversely of the length of the poker, and means for rotating the rollers to give the poker vertical movement.

8. The combination of a gas producer, a top therefor having therein a poke-hole, a poker in said poke-hole, a pair of rollers above the top having a pass between them for the poker, means for moving the rollers transversely of the length of the poker, and means for holding the rollers yieldingly toward each other to permit the poker to be inclined from a vertical position.

9. The combination of a battery of gas producers, a car movable over the same, a poker carried on said car and arranged to be introduced into any of said producers to agitate the charge therein, and means carried by the car for charging the gas producers.

10. The combination of a battery of gas producers each having a rotary top with a poke-hole therein, a car movable over the gas-producers, a rotary trolley on said car, a poker carried by the trolley, and means for moving the poker vertically.

11. The combination of a battery of gas producers, a car movable over the same, a poker carried on said car and arranged to be introduced into any of said producers to agitate the charge therein, and means for supplying a cooling fluid to the interior of said poker.

12. The combination of a battery of gas producers, a car movable over the same, and a poker carried on said car and arranged to be introduced into any of said producers to agitate the charge therein, and means for causing the poker to travel circularly and radially within the producer.

Signed at Pittsburg, Pa., this 11th day of May, 1908.

HORACE E. SMYTHE.
EDMUND W. SHINN.

Witnesses:
F. N. BARBER,
ANNA R. BEATTY.